UNITED STATES PATENT OFFICE.

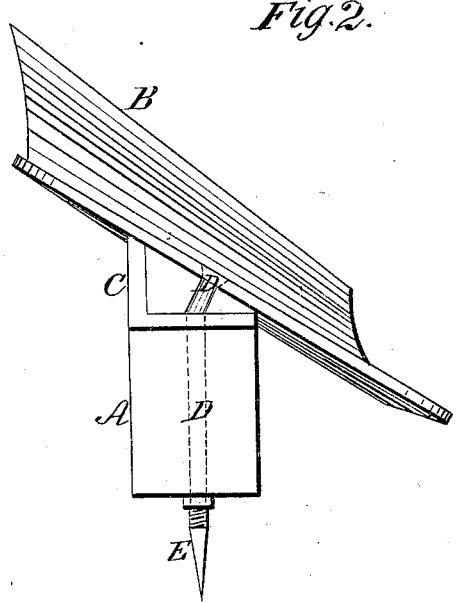
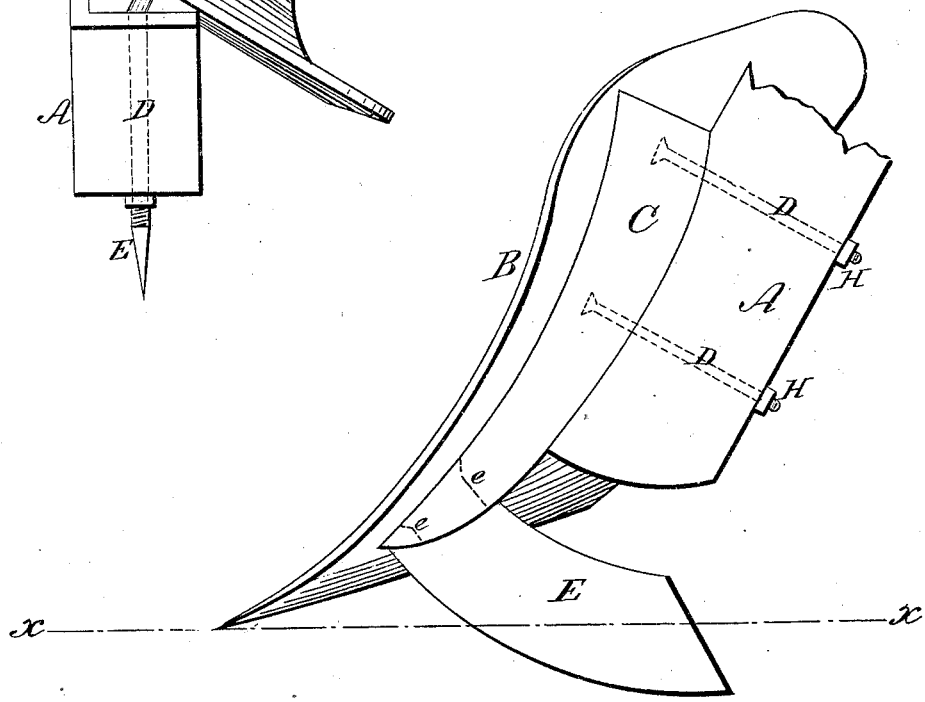

WILLIAM A. DRYDEN AND J. M. TURNBULL, OF MONMOUTH, ILLINOIS.

IMPROVEMENT IN CULTIVATORS.

Specification forming part of Letters Patent No. 94,725, dated September 14, 1869.

*To all whom it may concern:*

Be it known that we, WM. A. DRYDEN and J. M. TURNBULL, both of Monmouth, county of Warren, and State of Illinois, have invented certain new and useful Improvements in Guiding-Cutters for Cultivators; and we do hereby declare that the following is a full, clear, and exact description of the same, reference being had to the accompanying drawings, making a portion of this specification, in which—

Figure 1 is a side elevation of our invention. Fig. 2 is a top plan or view.

Similar letters of reference indicate corresponding parts in both figures.

The nature of this invention relates to an improvement in cultivators; and the invention consists in attaching a cutter in rear of the shovel, said cutter having an edge extending below the level of the lower edge of said shovel and cutting into the hard soil below the depth reached by the shovel.

To enable others to understand the construction and operation of our invention, we will proceed to describe it with reference to the drawings.

A represents the lower end of the shank of an ordinary cultivator-plow.

B represents one of that class of cultivator-shovels known as the "diamond," or, more generally, as the "mold-board" or "curved shovel." It is one of that class of shovels curved in the line of its vertical length, and attached to the shank of the plow obliquely, with the line of draft laterally. These shovels are used "rights" and "lefts" to throw the dirt in either direction, respectively, the one shown being a "right."

C represents a metal plate attached to the shovel B by the bolts D, which extend through the shank A, and are secured by the nuts H.

E represents the cutter, the dotted lines $e$ exhibiting the manner it is secured to the plate C by passing through a mortise in the same, and being riveted on the front side of the plate C. This manner of attaching the cutter leaves the front side of the shovel unmarred. It may be attached, however, by riveting the cutter directly to the shovel, or by securing it to the lower end of the shank.

The line $x\ x$ in the drawings represents the depth to which the shovel B is supposed to penetrate the earth. The cutter E, being either straight or curved, is set to extend a little below this line $x\ x$ into the hard soil, the lower edge of the cutter being sharp, so it may penetrate said soil.

The operation of our invention is as follows: In using the class of shovels described above, the pressure of the earth, striking the oblique surface of the shovels, has a continual tendency to deflect the plows from the line of the draft, and requires the continual exertion of the plowman to keep the right-hand plows from bearing to the left and the left-hand plows from bearing to the right. The cutter described above, as will be plainly seen, will serve to guide and hold the plows firmly in the direct line of draft, at the same time steadying the motion of the plows in other respects.

Having thus described our invention, what we claim as new, and desire to secure by Letters Patent, is—

1. The combination and arrangement of the shovel B, plate C, and cutter E, substantially as described, and for the purpose set forth.

2. The combination of the shovel B and the cutter E in its rear, as and for the purpose described.

Signed at Monmouth, Illinois, this 30th day of June, 1869.

W. A. DRYDEN. [L. S.]
  JNO. M. TURNBULL.

Witnesses:
 A. F. CAMPBELL,
 WM. M. BUFFINGTON.